(12) United States Patent
Kim et al.

(10) Patent No.: US 9,329,693 B2
(45) Date of Patent: May 3, 2016

(54) DISPLAY DEVICE AND METHOD OF SETTING GROUP INFORMATION

(71) Applicant: LG ELECTRONICS INC., Seoul (KR)

(72) Inventors: Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 14/080,525

(22) Filed: Nov. 14, 2013

(65) Prior Publication Data

US 2015/0067613 A1 Mar. 5, 2015

(30) Foreign Application Priority Data

Aug. 27, 2013 (KR) .................. 10-2013-0101845

(51) Int. Cl.
| | | |
|---|---|---|
| *G06F 3/048* | (2013.01) | |
| *G06F 3/01* | (2006.01) | |
| *G04G 13/02* | (2006.01) | |
| *G06F 3/0482* | (2013.01) | |
| *G06F 3/0488* | (2013.01) | |
| *G06F 3/0484* | (2013.01) | |
| *G06F 17/20* | (2006.01) | |

(52) U.S. Cl.
CPC .............. *G06F 3/017* (2013.01); *G04G 13/023* (2013.01); *G06F 3/0482* (2013.01); *G06F 3/04847* (2013.01); *G06F 3/04883* (2013.01); *G06F 17/20* (2013.01)

(58) Field of Classification Search
CPC ... G06F 3/017; G06F 3/0482; G06F 3/04883; G06F 3/0488; G06F 3/0485; G06F 3/048; G06F 3/0484; G06F 3/04842; G06F 3/04847
See application file for complete search history.

(56) References Cited

U.S. PATENT DOCUMENTS

| | | | |
|---|---|---|---|
| 2007/0008827 A1* | 1/2007 | Shin et al. ..................... 368/109 |
| 2008/0239881 A1 | 10/2008 | Kokuryu | |
| 2009/0147628 A1* | 6/2009 | Oh et al. ........................ 368/73 |
| 2011/0191675 A1 | 8/2011 | Kauranen | |
| 2013/0061122 A1 | 3/2013 | Sethi et al. | |
| 2013/0107673 A1 | 5/2013 | Oh et al. | |
| 2013/0167082 A1* | 6/2013 | Joo et al. ....................... 715/810 |

* cited by examiner

*Primary Examiner* — Claudia Dragoescu

(74) *Attorney, Agent, or Firm* — Birch, Stewart, Kolasch & Birch, LLP

(57) ABSTRACT

Disclosed are a display device and a method of setting group information by displaying additional information to be added to base information via first and second gesture inputs. The display device includes a display unit configured to display visual information, a sensor unit configured to detect an input signal and transmit a detected result to a processor, and the processor configured to control the display unit and the sensor unit. The processor is configured to display base information, detect a first gesture input to the displayed base information, determine an interval of additional information based on a position of the detected first gesture input, detect a second gesture input, determine the number of additional information based on a position of the detected second gesture input, and display at least one additional information according to the determined interval and the determined number of the additional information.

17 Claims, 14 Drawing Sheets

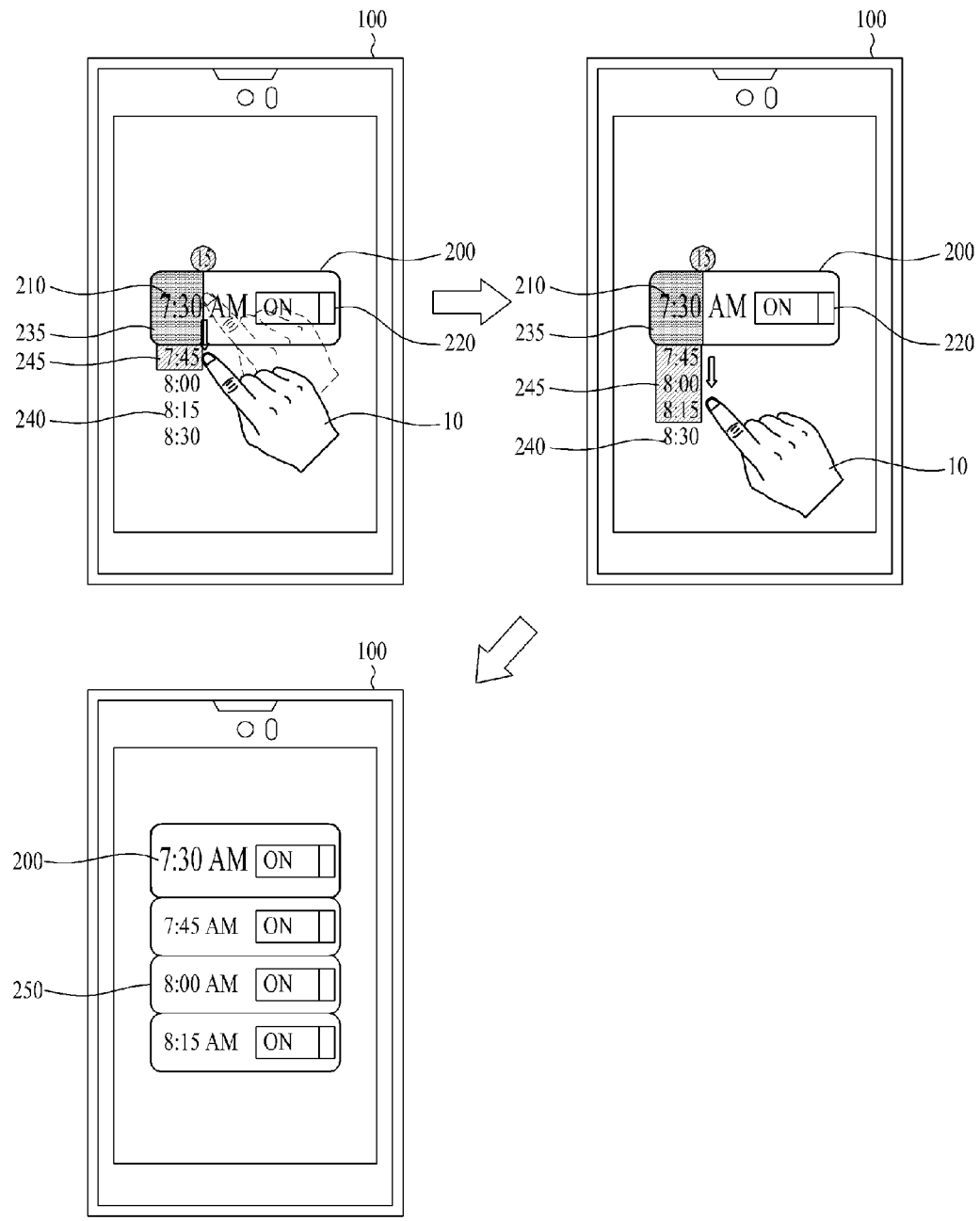

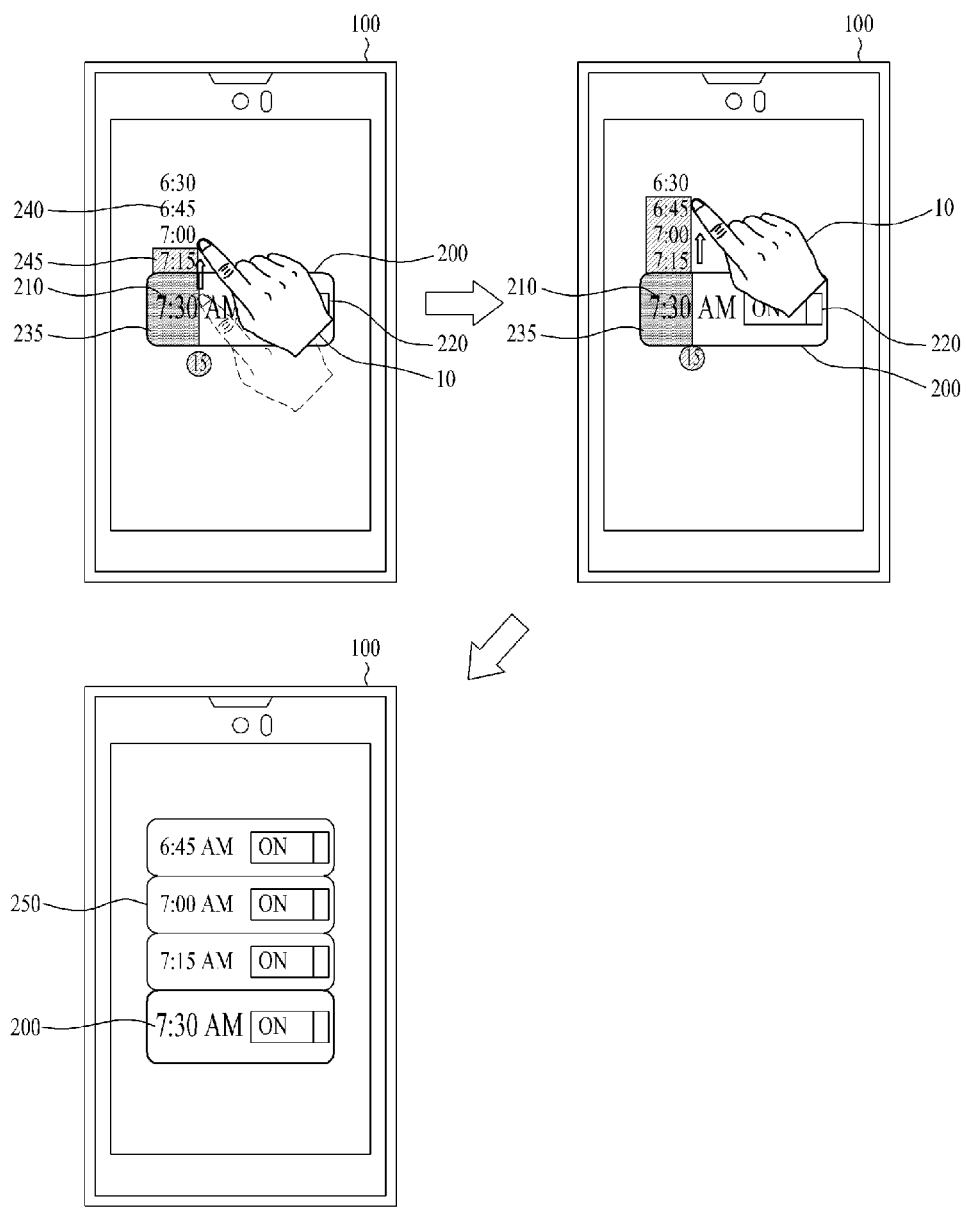

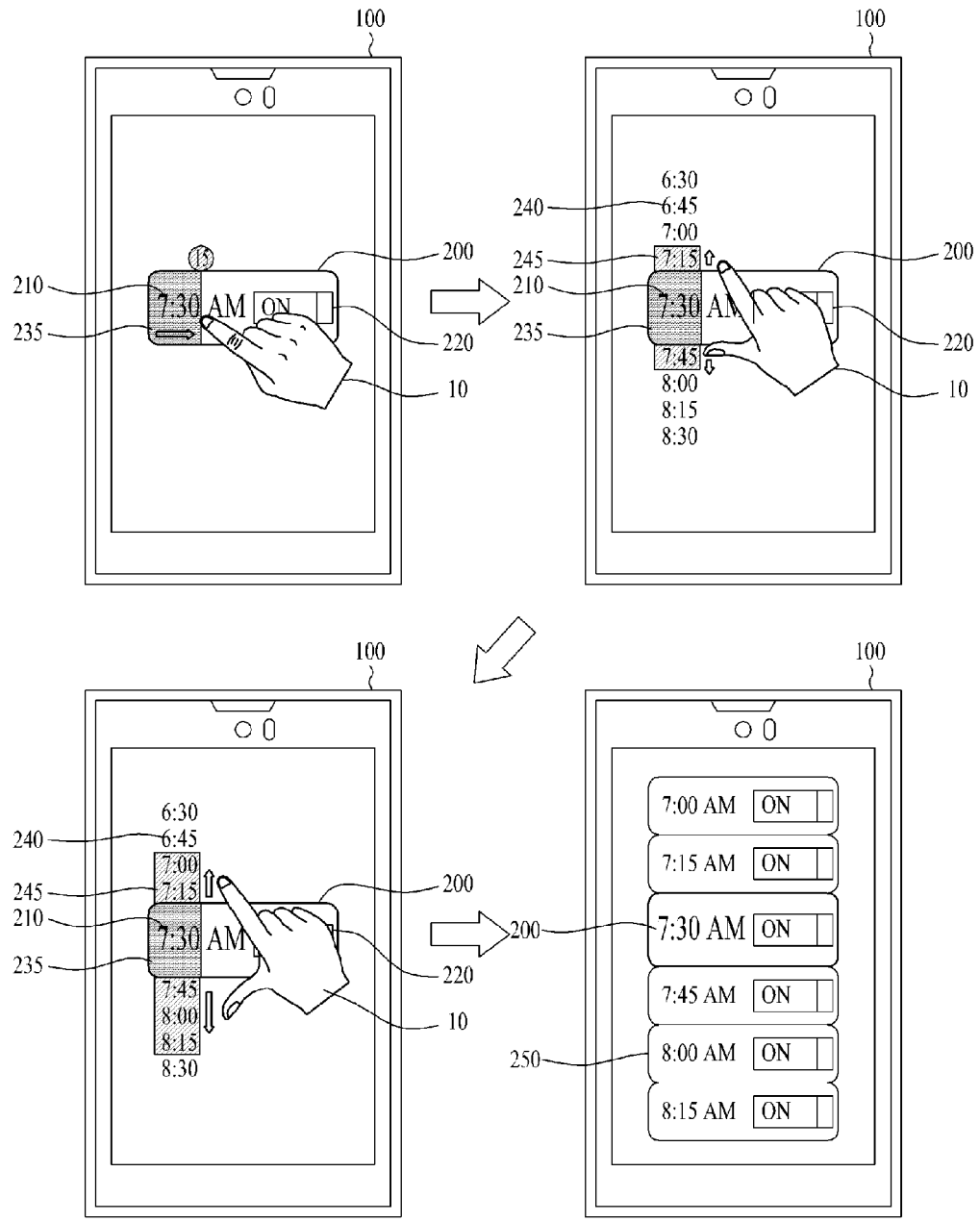

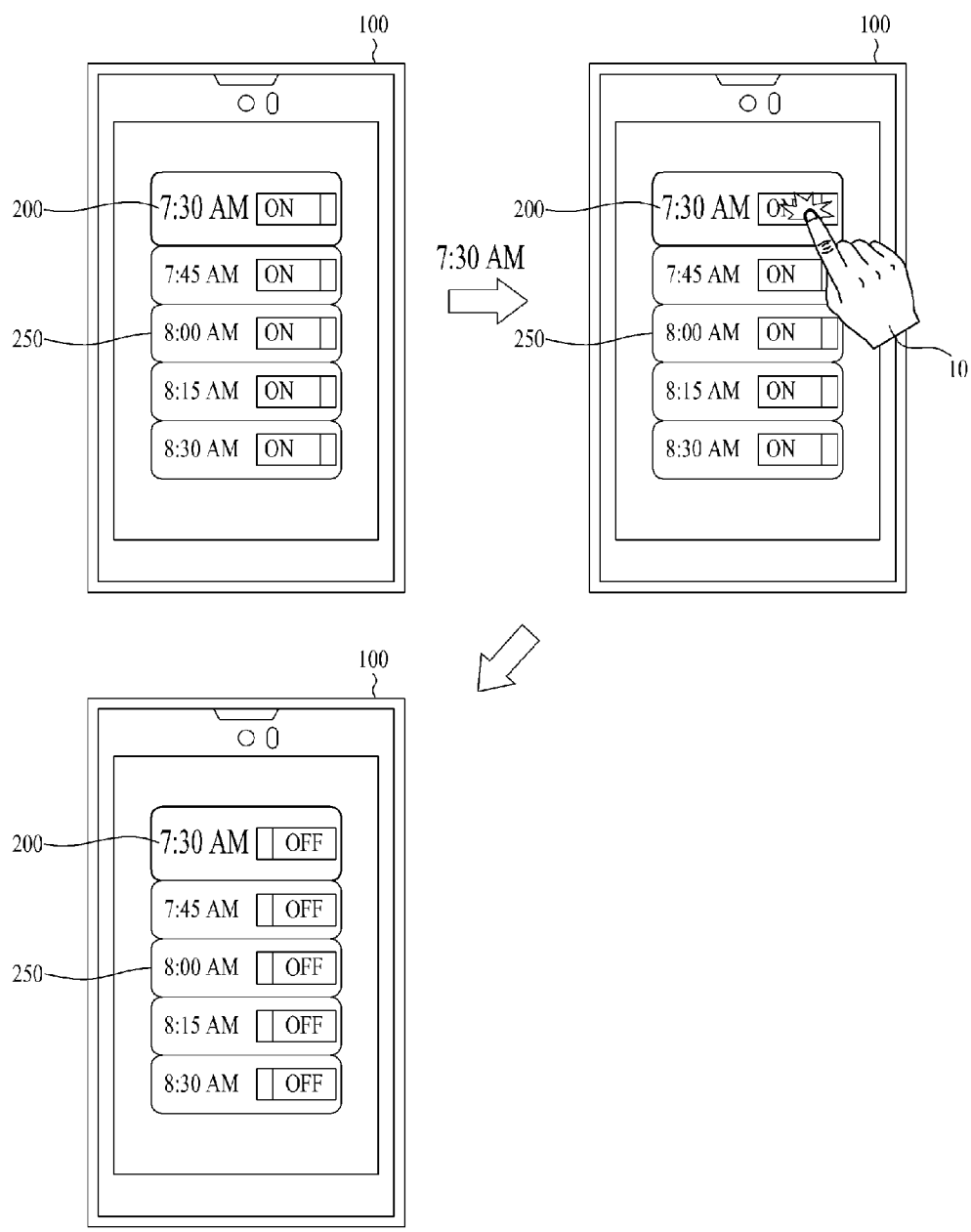

FIG. 7A
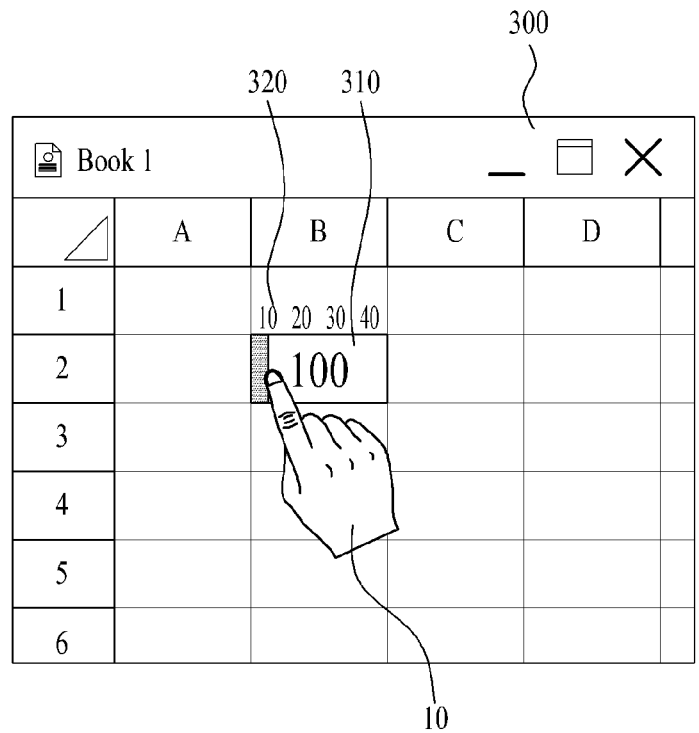
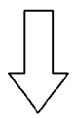
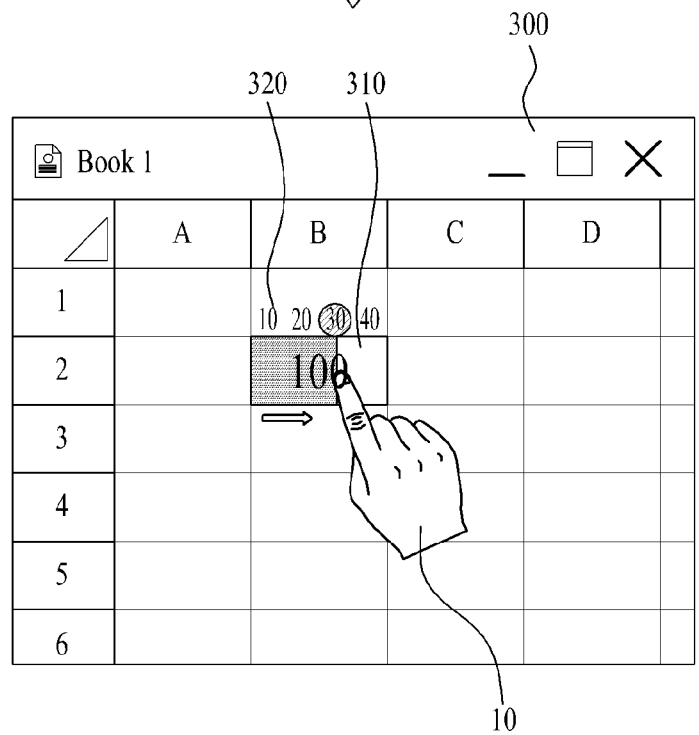

FIG. 7C

| | A | B | C | D |
|---|---|---|---|---|
| 1 | | | | |
| 2 | | 100 | | |
| 3 | | 130 | | |
| 4 | | 160 | | |
| 5 | | 190 | | |
| 6 | | 220 | | |

Book 1

300
310
340

DISPLAY DEVICE AND METHOD OF SETTING GROUP INFORMATION

This application claims the benefit of Korean Patent Application No. 10-2013-0101845, filed on, Aug. 27, 2013, which is hereby incorporated by reference as if fully set forth herein.

BACKGROUND OF THE INVENTION

1. Field of the Invention

The present disclosure relates to a display device and a method of setting group information, and more particularly to a method of setting group information by displaying additional information to be added to base information via a first gesture input and a second gesture input.

2. Discussion of the Related Art

With recent technological advances, display devices, such as those integrated into smart-phones, have begun to implement a wider array of functions. For instance, smart-phones may implement various functions, such as telephone calls, message transmission/reception, playback of moving images, image capture, web browsing, alarm setting, and the like.

When setting an alarm of a display device, a user occasionally sets a plurality of alarms at certain intervals, to prevent the user from falling to notice the alarm. In this case, setting the plurality of alarms one by one may inconvenience the user somewhat. Therefore, there is demand for easier alarm setting in the case of setting a plurality of alarms at certain intervals.

SUMMARY OF THE INVENTION

Accordingly, embodiments are directed to a display device and a method of setting group information that substantially obviate one or more problems due to limitations and disadvantages of the related art.

According to one embodiment, an object of the present disclosure is to easily and rapidly set group alarms via a user gesture input to a display device.

According to another embodiment, an object of the present disclosure is to enable deletion of all or only some group alarms via a gesture input to a display device.

According to another embodiment, an object of the present disclosure is to switch all group alarms from 'On' to 'Off' via a single gesture input to a display device.

According to a further embodiment, an object of the present disclosure is to easily input incremented/decremented information into a spreadsheet via a gesture when inputting information that needs to be incremented or decremented.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a display device according to one embodiment includes a display unit configured to display visual information, a sensor unit configured to detect an input signal and to transmit a detected result to a processor, and the processor configured to control the display unit and the sensor unit, wherein the processor is further configured to display base information, detect a first gesture input to the displayed base information, determine an interval of additional information based on a position of the detected first gesture input, detect a second gesture input, determine the number of additional information based on a position of the detected second gesture input, and display at least one additional information according to the determined interval and the determined number of the additional information.

In accordance with another embodiment, a method of setting group information of a display device, includes displaying base information, detecting a first gesture input to the displayed base information, determining an interval of additional information based on a position of the detected first gesture input, detecting a second gesture input, determining the number of additional information based on a length of the detected second gesture input, and displaying at least one additional information according to the determined interval and the determined number of the additional information.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIGS. 2a to 2c are views showing a first embodiment of setting of group alarms according to the present disclosure;

FIG. 3 is a view showing a second embodiment of setting of group alarms according to the present disclosure;

FIG. 4 is a view showing a first embodiment of control of group alarms according to the present disclosure;

FIGS. 7a to 7c are views showing one embodiment of group information according to the present disclosure.

DETAILED DESCRIPTION OF THE INVENTION

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

Figure 1:
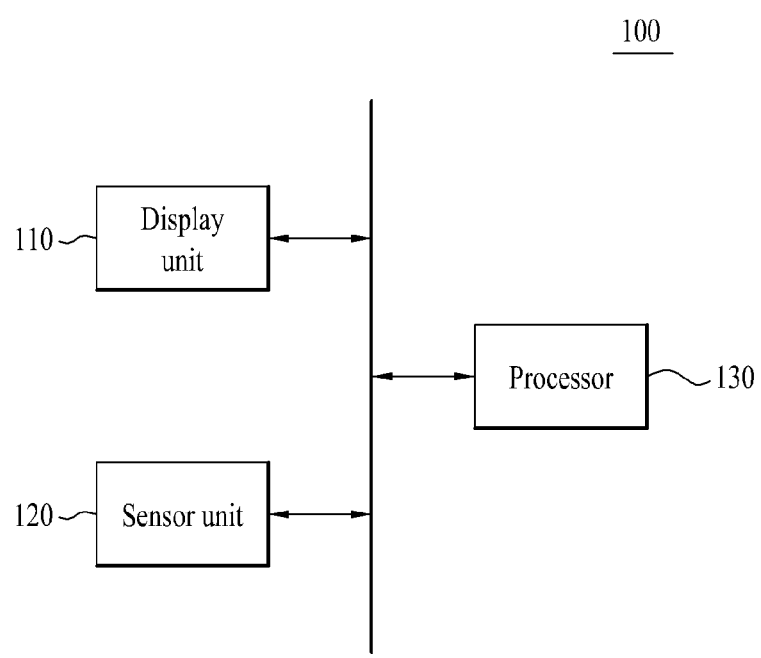
FIG. 1 is a block diagram of a display device according to the present disclosure.

FIG. 1 is a block diagram of a display device according to the present disclosure. It is noted that FIG. 1 indicates but one embodiment, and some constituent modules may be omitted or new constituent modules may be added as those skilled in the art will readily comprehend.

As exemplarily shown in FIG. 1, the display device 100 may include a display unit 110, a sensor unit 120, and a processor 130.

First, the display device 100 may include various devices that may display images, such as, for example, a Personal Digital Assistant (PDA), a laptop computer, a tablet PC, and a smart-phone.

The display unit 110 may output an image on a display screen. In addition, the display unit 110 may output an image based on content executed by the processor 130 or a control instruction of the processor 130. In the disclosure, the display unit 110 may display visual information. Here, the visual information may correspond to a group information interface.

The sensor unit 120 may sense a surrounding environment of the display device 100 using at least one sensor equipped in the display device 100 and transmit a sensed result in the form of a signal to the processor 130. In addition, the sensor unit 120 may sense a user input and transmit a sensed result in the form of a signal to the processor 130.

The sensor unit 120 may include at least one sensing means. In one embodiment, the at least one sensing means may include various sensing means, such as, for example, a gravity sensor, geomagnetic sensor, motion sensor, gyro sensor, accelerometer, infrared sensor, inclination sensor, brightness sensor, height sensor, olfactory sensor, temperature sensor, depth sensor, pressure sensor, bending sensor, audio sensor, video sensor, Global Positioning System (GPS) sensor, grip sensor, and touch sensor.

The sensor unit 120 is a generic term for the above enumerated various sensing means. The sensor unit 120 may sense a variety of user inputs and an environment of the display device 100, and transmit a sensed result to the processor 130 to allow the processor 130 to implement an operation based on the sensed result. The above enumerated sensors may be provided as individual elements included in the display device 100, or may be combined to constitute at least one element included in the display device 100.

In the present disclosure, the sensor unit 120 may sense a user input to the display unit 110 and transmit a sensed result to the processor 130. Here, the user input is a gesture input including a touch input, a drag input, and the like.

The processor 130 may process data, and control the aforementioned respective units of the display device 100 as well as data transmission/reception between the units.

In the present disclosure, the processor 130 may display base information on the display unit 110. In addition, the processor 130 may detect a first gesture input with respect to the displayed base information. The processor 130 may determine an interval of additional information based on a position of the detected first gesture input. In addition, the processor 130 may detect a second gesture input with respect to the display unit 110. The processor 130 may determine the number of additional information based on a position of the detected second gesture input. Then, the processor 130 may display at least one additional information according to the determined interval and the determined number of the additional information.

In one embodiment of the present disclosure, the processor 130 may control operations to be implemented by the display device 100. For convenience, all of these operations will be described as being implemented/controlled by the display device 100 in the following description and the drawings.

Although not shown in FIG. 1, the display device 100 may include a storage unit, a communication unit, a power unit, and the like. The storage unit may store various digital data including audio, moving images, still images, and the like. The storage unit may store programs for processing and control of the processor 130, and may temporarily store input/output data. For instance, the storage unit may be located inside or outside the display device 100.

The communication unit may implement communication with an external device using various protocols to receive or transmit data. In addition, the communication unit may access an external network in a wired or wireless manner to receive or transmit digital data, such as content, and the like. For instance, the communication unit may use Wireless LAN (WLAN)(Wi-Fi), Wireless broadband (Wibro), World Interoperability for Microwave Access (Wimax), High Speed Downlink Packet Access (HSDPA) communication standards, for access to a wireless network.

The power unit is a power source connected to a battery inside the display device 100 or an external power source, and may supply power to the display device 100.

In FIG. 1 as a block diagram of the display device 100 according to one embodiment, separately shown blocks logically distinguish elements of the device 100. Accordingly, the elements of the above-described display device 100 may be mounted as a single chip or a plurality of chips based on device design.

The present disclosure relates to a method of setting group information in the display device 100. The user may set group information in the display unit 110 using the display device 100. Here, the group information refers to information wherein plural units of correlated information are generated and grouped in a predetermined sequence. For instance, the group information may include group alarms (i.e. a group of alarms), and group data of a spreadsheet program, such as Excel. With regard to this group information, FIGS. 2a to 6b illustrate methods of setting and controlling group alarms, and FIG. 7 illustrates a method of setting group information in a spreadsheet.

Figure 2A:
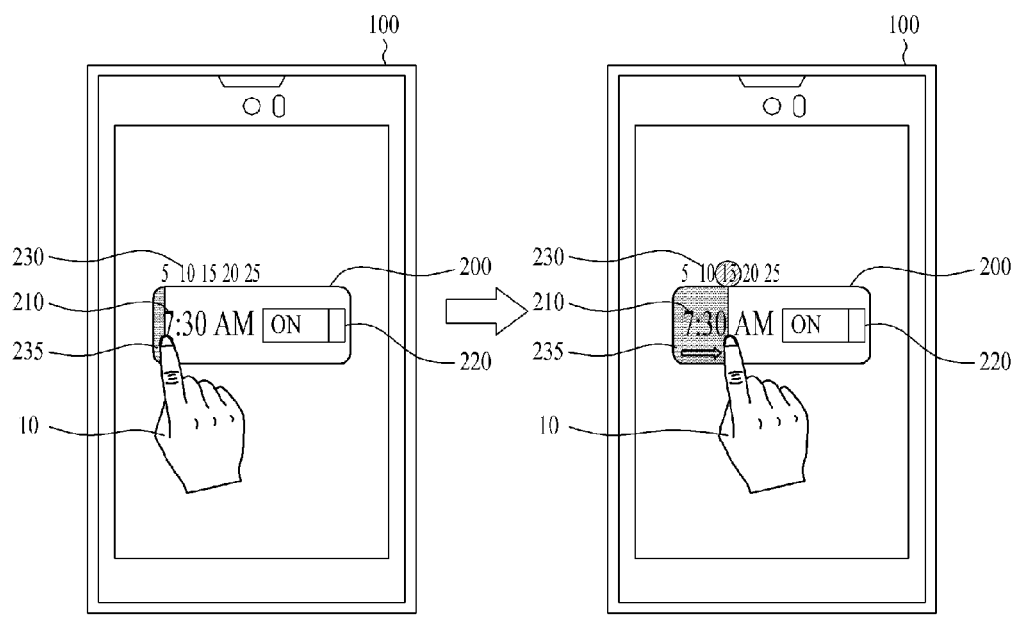

FIGS. 2a to 2c are views indicating a first embodiment of setting of group alarms according to the present disclosure. More specifically, FIG. 2a indicates setting of group alarms via a first gesture input, and FIGS. 2b and 2c are views indicating setting of group alarms via a second gesture input.

First, the display device 100 may display a base alarm 200 on the display unit 110. Here, the base alarm 200 may correspond to an alarm preset in the display device 100. For instance, the base alarm 200 may correspond to an alarm that a user 10 sets before setting group alarms.

Next, the display device 100 may detect a first gesture input to the base alarm 200. The first gesture input may include a touch input and a hovering input by the user 10. In FIG. 2a, the first gesture input corresponds to a drag input to the base alarm 200. It is noted that a position of the first gesture input to the base alarm 200 is not specified so long as the first gesture input is detected within the base alarm 200 displayed on the display unit 110. Moreover, in FIG. 2a, the first gesture input may correspond to a rightward input.

The display device 100 may recognize that the user 10 attempts to set group alarms when the first gesture input to the base alarm 200 is detected. As exemplarily shown in FIG. 2a, if the first gesture input is a drag input, the display device 100 may detect beginning and end positions of the first gesture input to the base alarm 200.

Next, the display device 100 may determine a time interval of additional alarms based on a position of the detected first gesture input. More specifically, the display device 100 may determine a time interval of additional alarms according to amount of movement in position of the detected first gesture input. In FIG. 2*a*, the amount of movement in position of the first gesture input represents a difference between the beginning position and the end position of the first gesture input. In addition, the display device 100 may display a time interval interface 230 when the first gesture input is detected.

In one example, the display device 100 may display the time interval interface 230 at one of upper and lower sides and left and right sides of the base alarm 200 when the beginning position of the first gesture input to the base alarm 200 is detected. In FIG. 2*a*, the time interval interface 230 is displayed at the upper side of the base alarm 200.

The time interval interface 230 represents a time interval for setting of group alarms on the basis of a time of a base alarm. Referring to FIG. 2*a*, the time interval interface 230 may display a time interval of group alarms set to 5 minutes, 10 minutes, 15 minutes, 20 minutes, and 25 minutes. Here, the time interval displayed by the time interval interface 230 may correspond to a time interval predetermined by the display device 100 or a time interval predetermined by the user 10. Although FIG. 2*a* indicates that the last time is 25 minutes, the time interval to be displayed may be increased in increments of 5 minutes as a position of the first gesture input is moved rightward.

In another example, the display device 100 may determine a time interval of additional alarms when the end position of the first gesture input to the base alarm 200 is detected. That is, the display device 100 may determine a time interval of additional alarms based on a position of the time interval interface 230 corresponding to the end position of the first gesture input. In the embodiment of FIG. 2*a*, a time interval of additional alarms may correspond to 15 minutes based on a position of the hand of the user 10.

The display device 100 may provide a graphic effect 235 based on the first gesture input to the base alarm 200 to allow the user 10 to easily recognize a time interval of additional alarms. In the embodiment of FIG. 2*a*, the graphic effect 235 located at the beginning position of the first gesture input constitutes a partial left portion of the base alarm 200. However, as the first gesture input is moved rightward, the graphic effect 235 is gradually extended rightward. This may assist the user 10 in intuitively recognizing a time interval determined upon setting of the time interval.

Next, the display device 100 may detect a second gesture input. Here, the second gesture input may correspond to a gesture input to the base alarm 200. In addition, the second gesture input may include a touch input and a hovering input by the user 10. In FIGS. 2*b* and 2*c*, the second gesture input corresponds to a drag input to the base alarm 200. It is noted that the second gesture input is not necessarily a gesture input to the base alarm 200 so long as the second gesture input is detected by the display unit 110. The second gesture input in FIG. 2*b* may correspond to a downward input, and the second gesture input in FIG. 2*c* may correspond to an upward input.

The second gesture input is subsequent to the first gesture input. The second gesture input may correspond to a gesture input detected within a predetermined time from when the display device 100 detects the first gesture input. Accordingly, as exemplarily shown in FIGS. 2*b* and 2*c*, the display device 100 may detect the first gesture input to the base alarm 200, and thereafter detect the second gesture input within a predetermined time from when the display device 100 detects the first gesture input. In addition, the second gesture input may be connected to the first gesture input. In addition, the directions of the first gesture input and the second gesture input may be perpendicular to each other. That is, the display device 100 may detect the rightward first gesture input, and subsequently may detect the downward second gesture input.

Next, the display device 100 may determine the number of additional alarms based on a position of the detected second gesture input. More specifically, the display device 100 may determine the number of additional alarms according to amount of movement in position of the detected second gesture input. In FIGS. 2*b* and 2*c*, the amount of movement in position of the second gesture input is a difference between the beginning position and the end position of the second gesture input. In addition, the display device 100 may display an additional alarm interface 240 when the second gesture input is detected.

The additional alarm interface 240 represents at least one additional alarm that may be added according to a time interval determined on the basis of a time of the base alarm 200. For instance, referring to FIG. 2*b*, if a time interval is 15 minutes, the additional alarm interface 240 may display alarms to be added at a time interval of 15 minutes from '7:30 AM'. Although the second gesture input is a downward input and thus the additional alarm interface 240 is displayed only downward in FIG. 2*b*, the additional alarm interface 240 may be displayed upward and downward regardless of the direction of the gesture input.

The display device 100 may determine whether an additional alarm proceeds or follows the base alarm 200 based on the direction of the second gesture input. In one example, if the direction of the second gesture input is in a first direction, the display device 100 may add at least one additional alarm after the base alarm 200 according to a time interval. Referring to FIG. 2*b*, if the second gesture input is a downward gesture, the display device 100 may determine that the user wishes to add an alarm after the base alarm 200. More specifically, the display device 100 may determine that the user wishes to add three additional alarms set respectively to '7:45', '8:00', and '8:15' based on a position of the second gesture input.

In another example, if the direction of the second gesture input is in a second direction, the display device 100 may add at least one additional alarm before the base alarm 200 according to a time interval. Here, the second direction may be opposite to the first direction. Referring to FIG. 2*c*, if the second gesture input is an upward gesture, the display device 100 may determine that the user wishes to add an alarm before the base alarm 200. More specifically, the display device 100 may determine that the user wishes to add three additional alarms set respectively to '7:15', '7:00', and '6:45' based on a position of the second gesture input.

Meanwhile, the display device 100 may provide a graphic effect 245 based on the second gesture input to allow the user 10 to easily recognize an additional alarm to be added. In an embodiment of FIG. 2*b*, the graphic effect 235 at the beginning position of the second gesture input constitutes a portion of the additional alarm interface 240. On the other hand, the graphic effect 245 is gradually extended downward as the second gesture input is moved downward. This may assist the user 10 in intuitively recognizing an additional alarm that may be determined upon setting of the additional alarm.

Next, the display device 100 may display at least one additional alarm according to the determined time interval as well as the determined number of additional alarms. In one example, in FIG. 2*a*, the display device 100 may determine a time interval of additional alarms to be 15 minutes based on a position of the first gesture input. In addition, in FIG. 2*b*, the display device 100 may determine the number of additional alarms following the base alarm 200 to be 3 based on a position of the second gesture input. In this case, as exemplarily shown in FIG. 2b, the display device 100 may display three additional alarms 250 at a time interval of 15 minutes in a downward direction of the base alarm 200.

In another example, in FIG. 2a, the display device 100 may determine a time interval of additional alarms to be 15 minutes based on a position of the first gesture input. In addition, in FIG. 2c, the display device 100 may determine the number of additional alarms preceding the base alarm 200 to be 3 based on a position of the second gesture input. In this case, as exemplarily shown in FIG. 2c, the display device 100 may display three additional alarms 250 in an upward direction of the base alarm 200 at a time interval of 15 minutes.

The display device 100 may display the additional alarms 250 having different graphic effects than the base alarm 200. In one example, as exemplarily shown in FIG. 2b, to easily distinguish the additional alarms 250 and the base alarm 200 from each other, the display device 100 may display the additional alarms 250 smaller than the base alarm 200. In another example, although not shown in FIG. 2, the display device 100 may display the additional alarms 250, the color of which is different from the color of the base alarm 200.

Through the embodiments of FIGS. 2a to 2c, the user 10 may easily and rapidly set a plurality of alarms via two intuitive gesture inputs to the display device 100.

FIG. 3 is a view indicating a second embodiment of setting of group alarms according to the present disclosure. More specifically, FIG. 3 indicates setting of group alarms using first to third gesture inputs.

First, as described above with reference to FIG. 2a, the display device 100 may determine a time interval of additional alarms based on a position of a first gesture input. Referring to FIG. 3, a time interval of additional alarms may correspond to 15 minutes.

Next, the display device 100 may detect a second gesture input and a third gesture input. For instance, the directions of the second gesture input and the third gesture input may be opposite to each other. Referring to FIG. 3, the second gesture input may be input by the thumb of the user 10, and the third gesture input may be input by the index finger of the user 10. In addition, for instance, the display device 100 may almost simultaneously detect the second gesture input and the third gesture input.

The display device 100 may display the additional alarm interfaces 240 above and below the base alarm 200 when the second gesture input and the third gesture input are detected. Referring to FIG. 3, if a time interval is determined to be 15 minutes, the display device 100 may display the additional alarm interfaces 240 above and below the base alarm 200 at a time interval of 15 minutes on the basis of '7:30' that is a time of the base alarm 200.

Next, the display device 100 may determine that the user wishes to add at least one additional alarm before and after the base alarm 200 according to a time interval based on a position of the detected second gesture input and a position of the detected third gesture input. In FIG. 3, if the second gesture input is input by the thumb, the end position of the second gesture input corresponds to '8:15'. In addition, if the third gesture input is input by the index finger, the end position of the third gesture input corresponds to '7:00'. Accordingly, the display device 100 may determine that the user wishes to add two alarms before '7:30' that is a time of the base alarm 200 and wishes to add three alarms after '7:30' according to positions of the inputs by the thumb and the index finger.

The display device 100 may provide the graphic effect 245 based on the second gesture input and the third gesture input to allow the user 10 to easily recognize additional alarms. In the embodiment of FIG. 3, if the second gesture input is input by the thumb, the graphic effect 245 is downwardly extended as the thumb moves from the beginning position to the end position of the second gesture input. In addition, in the embodiment of FIG. 3, if the third gesture input is input by the index finger, the graphic effect 245 is upwardly extended as the index finger moves from the beginning position to the end position of the third gesture input. Thereby, the user 10 may intuitively recognize increase/reduction of the number of additional alarms.

Next, the display device 100 may display at least one additional alarm according to the determined time interval as well as the determined number of additional alarms. For instance, as exemplarily shown in FIG. 3, the time interval may be determined to be 15 minutes, and the number of additional alarms to be added before and after a time of the base alarm 200 may respectively be determined to be 2 and 3. In this case, the display device 100 may display two additional alarms 250 above the base alarm 200 at a time interval of 15 minutes and three additional alarms 250 below the base alarm 200 at a time interval of 15 minutes.

Through the embodiment of FIG. 3, the user may simultaneously input the second and third gesture inputs after the first gesture input, and may easily display a plurality of alarms before and after a time of the base alarm.

FIG. 4 is a view indicating a first embodiment of control of group alarms according to the present disclosure. More specifically, FIG. 4 indicates that group alarms are switched off by a fourth gesture input if a time of at least one of the group alarm has come.

As described above with reference to FIGS. 2a to 2c and FIG. 3, the display device 100 may display the base alarm 200 as well as the at least one additional alarm 250. In this case, the base alarm 200 and the additional alarm 250, which are previously set, may be in an 'On' state.

A time of at least one of the base alarm 200 and the additional alarm 250 may be come upon. Referring to FIG. 4, the display device 100 may detect that a time of the base alarm 200 has come at '7:30 AM'. In addition, the display device 100 may notify the user 10 that an alarm time has come via sound, vibration, graphic effects.

In this case, the display device 100 may detect a fourth gesture input to at least one alarm included in group alarms, i.e. a group of alarms. Here, the fourth gesture input is an input by the user 10, and may include a touch input, a drag input, and a hovering input. For instance, in FIG. 4, the fourth gesture input may correspond to a touch input. The fourth gesture input may correspond to an input to an alarm included in a group of alarms, a time of which has come. For instance, in FIG. 4, the fourth gesture input may correspond to an alarm set to '7:30 AM'. Here, a position of the fourth gesture input may correspond to an 'On/Off' button of the alarm set to '7:30 AM'. It is noted that a position of the fourth gesture input is not limited thereto.

Next, the display device 100 may switch off all alarms included in the group of alarms based on the detected fourth gesture input. The user 10 may set group alarms in consideration of a situation in which the user 10 is not awakened by one or two alarms. Accordingly, if the display device 100 detects an input by the user 10 to switch off alarm setting with respect to one of a plurality of alarms, that the user 10 awakes may be judged and alarms that are set thereafter should be deactivated. Therefore, the display device 100 may switch off all of the alarms. Referring to FIG. 4, the display device 100 may switch off the alarm set to '7:30 AM' as well as the four other alarms set thereafter based on the fourth gesture input to the alarm set to '7:30 AM'.

Differently from FIG. 4, the display device 100 may switch off only an alarm, corresponding to the fourth gesture input, among alarms included in a group of alarms based on the detected fourth gesture input. The user 10 may set an alarm to switch off in various ways.

Figure 5A:
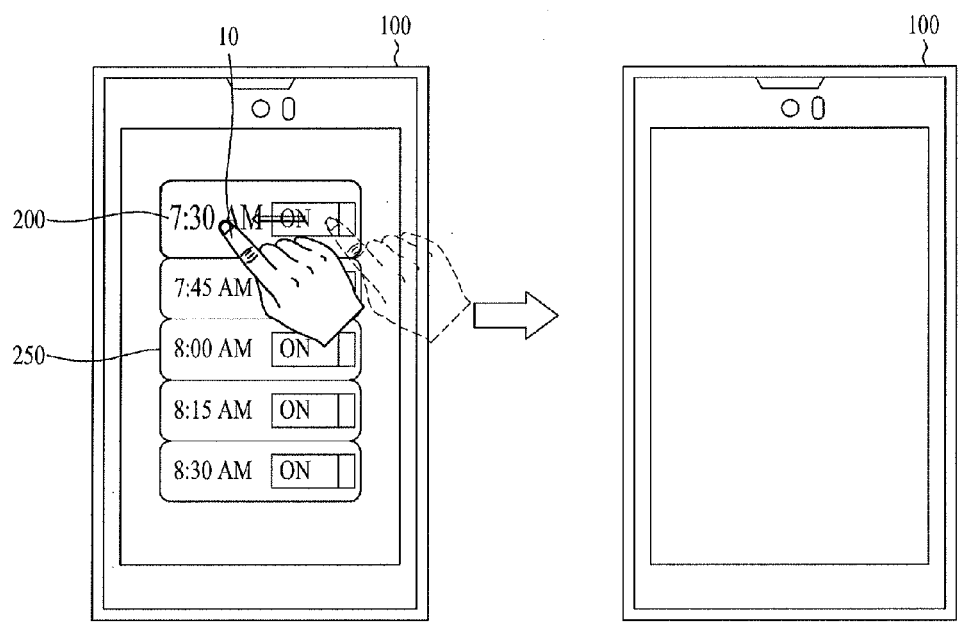
FIGS. 5a and 5b are views showing a second embodiment of control of group alarms according to the present disclosure.
Figure 5B:
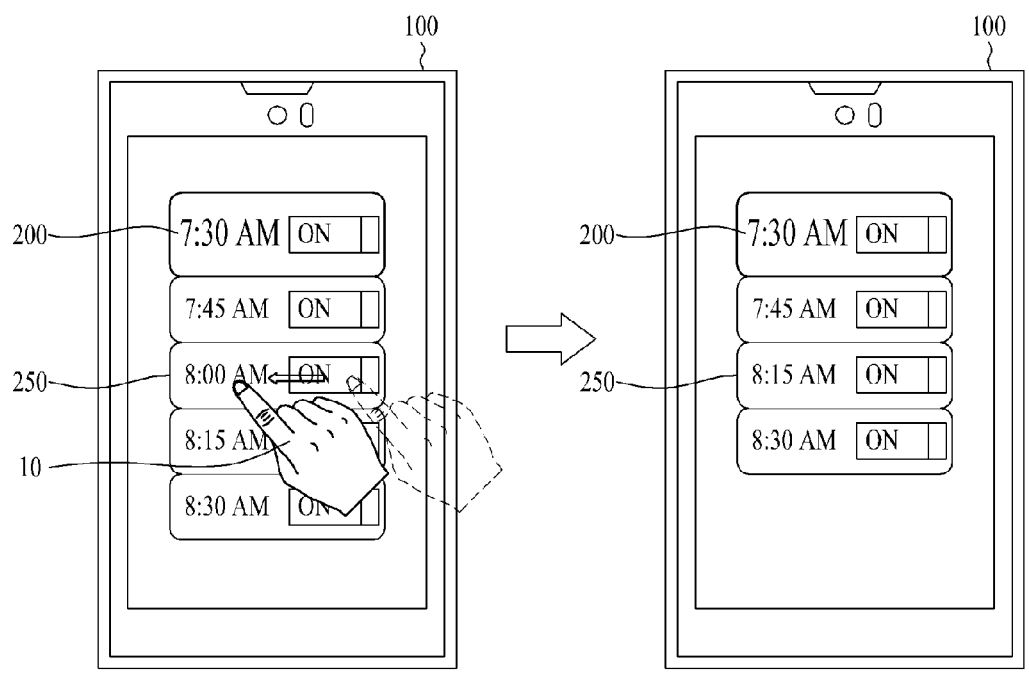

FIGS. 5a and 5b are views indicating a second embodiment of control of group alarms according to the present disclosure. More specifically, FIG. 5a indicates deletion of all group alarms by a fifth gesture input, and FIG. 5b indicates deletion of some of group alarms by a sixth gesture input.

As exemplarily shown in FIGS. 5a and 5b, the display device 100 may display the base alarm 200 and a plurality of additional alarms 250. In this case, for instance, the user 10 may no longer need group alarms, or deletion of all group alarms may be necessary to change times of the group alarms.

In this case, the display device 100 may detect a fifth gesture input to the base alarm 200. Here, the fifth gesture input to the base alarm 200 is to delete the base alarm 200 that is the source of group alarms. Thus, the fifth gesture input may correspond to an input to delete the base alarm 200 as well as all additional alarms 250 derived from the basic alarm 200.

The fifth gesture input is an input by the user 10, and may include a touch input, a hovering input, and a drag input. For instance, in FIG. 5a, the fifth gesture input may correspond to a drag input. In addition, the direction of the fifth gesture input may be opposite to the direction of the first gesture input for setting of group alarms as described above with reference to FIGS. 2a to 2c. For instance, in FIG. 5a, the fifth gesture input may correspond to a leftward input opposite to the rightward first gesture input. It is noted that the end position of the fifth gesture input is not necessarily located within the base alarm 200 so long as the beginning position of the fifth gesture input is located within the base alarm 200. In addition, it is noted that amount of movement in position of the fifth gesture input is not necessarily determined so long as the fifth gesture input exhibits movement from the right side to the left side.

Next, the display device 100 may delete all group alarms based on the detected fifth gesture input. In an embodiment of FIG. 5a, the display device 100 may delete five alarms included in a group of alarms based on a leftward input to the base alarm 200. Through the embodiment of FIG. 5a, if the user 10 wishes to delete all group alarms, the user 10 may easily delete all of the group alarms via a single gesture input.

In another example, if the number of alarms included in a group of alarms is great, or if the user does not need all alarms included in the group of alarms, deletion of some of the alarms included in the group of alarms may be necessary.

In this case, the display device 100 may detect a sixth gesture input to at least one additional alarm 250. Here, the sixth gesture input to the at least one additional alarm 250 may correspond to an input to delete an alarm, at which the sixth gesture input is detected, among a plurality of alarms included in the group of alarms.

In FIG. 5b, the sixth gesture input may correspond to a drag input by the user 10. In addition, the direction of the sixth gesture input may be opposite to the direction of the first gesture input, in the same manner as the above-described direction of the fifth gesture input. It is noted that the end position of the sixth gesture input is not necessarily located within the additional alarm 250 so long as the beginning position of the sixth gesture input is located within the additional alarm 250. In addition, it is noted that amount of movement in position of the sixth gesture input is not necessarily determined so long as the sixth gesture input exhibits movement from the right side to the left side.

Next, the display device 100 may delete an additional alarm, at which the sixth gesture input is detected, among group alarms based on the detected sixth gesture input. In an embodiment of FIG. 5b, the display device 100 may delete a single alarm set to '8:00 AM' among the additional alarms based on a leftward input to the alarm set to '8:00 AM'. Through the embodiment of FIG. 5b, if the user 10 wishes to delete only some of the group alarms, individual deletion of the group alarms is possible.

Figure 6A:
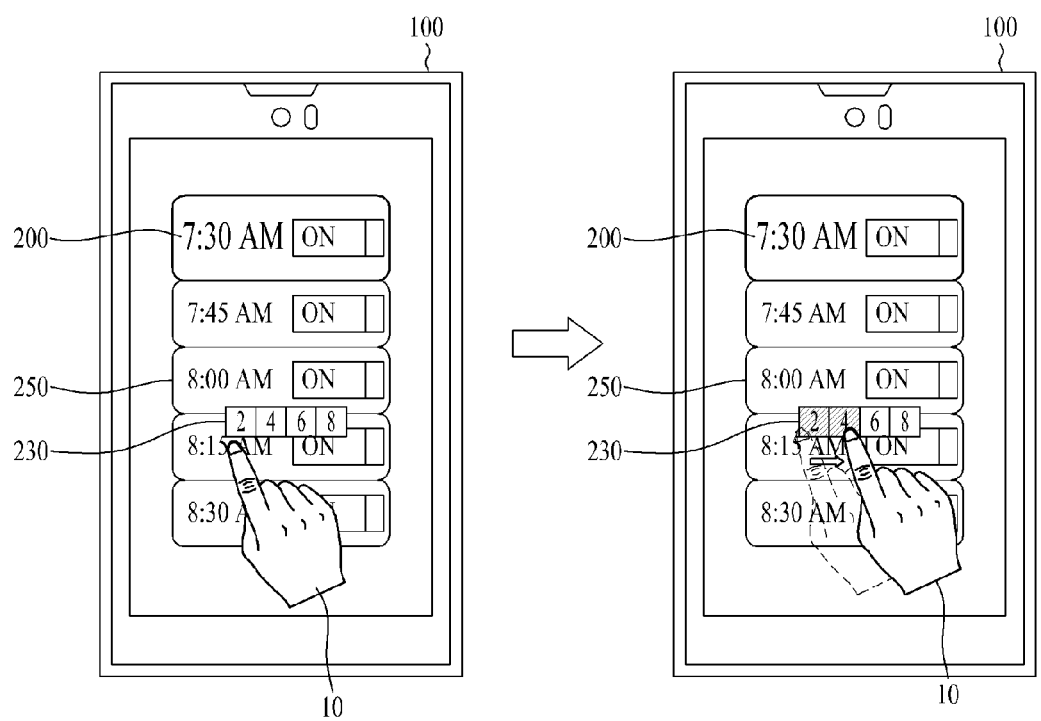
FIGS. 6a and 6b are views showing a third embodiment of control of group alarms according to the present disclosure.
Figure 6B:
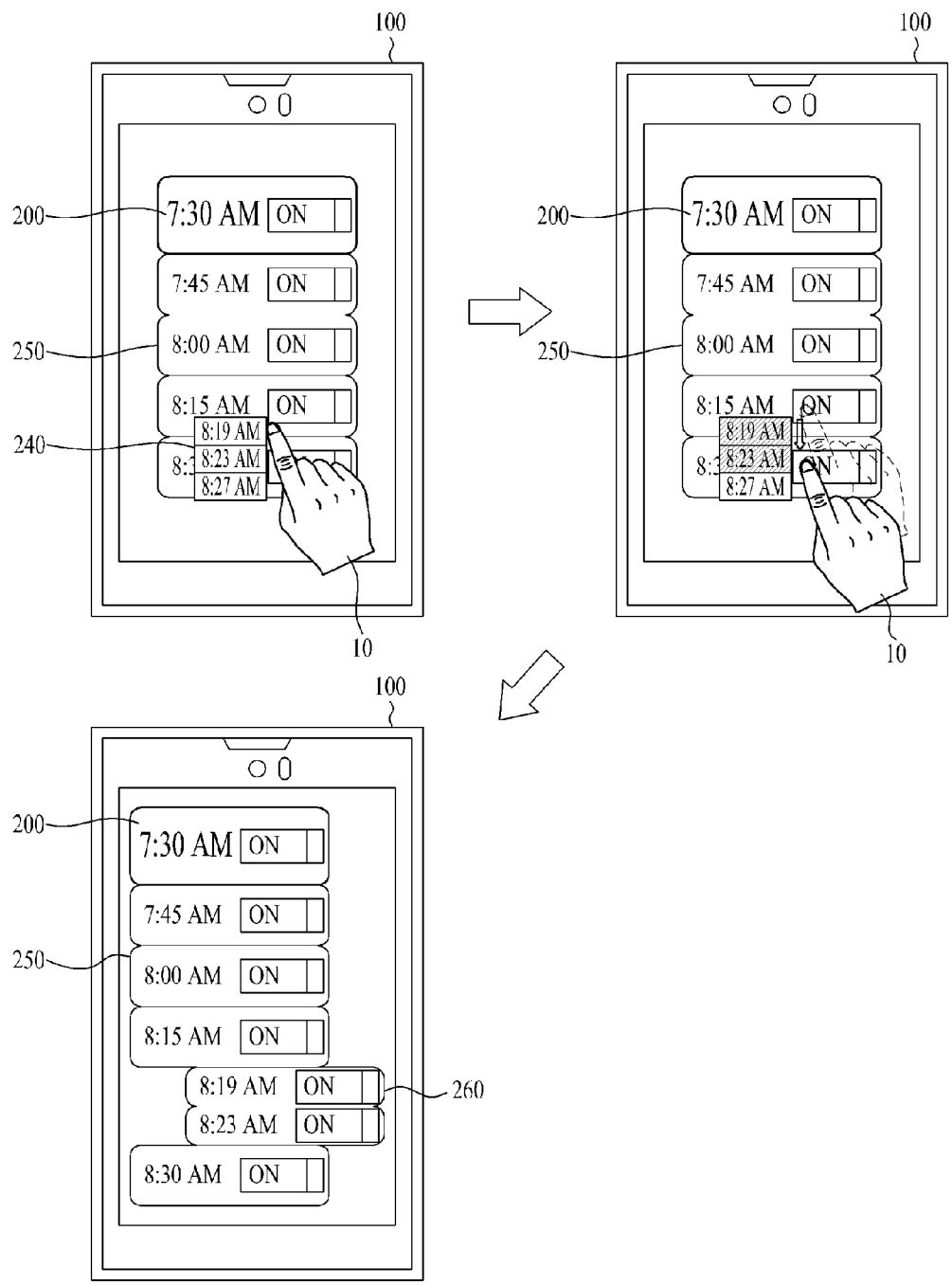

FIGS. 6a and 6b are views indicating a third embodiment of control of group alarms according to the present disclosure. More specifically, FIG. 6a indicates setting of a second additional alarm by a seventh gesture input, and FIG. 6b indicates setting of a second additional alarm by an eighth gesture input. In the following description of the embodiments of setting of the second additional alarm in FIGS. 6a and 6b, the same parts as those of the embodiment of FIG. 2 of setting of additional alarms will not be described in detail.

As exemplarily shown in FIG. 6a, if group alarms are set, the user 10 may wish to set a second additional alarm derived from the additional alarm 250. Here, the additional alarm 250 may correspond to a first additional alarm. In this case, the display device 100 may detect a seventh gesture input to at least one additional alarm 250 displayed on the display unit 110. Here, the seventh gesture input is an input by the user 10, and may include a touch input, a hovering input, and a drag input. For instance, in FIG. 6a, the seventh gesture input may correspond to a drag input. In addition, the direction of the seventh gesture input may be equal to the direction of the first gesture input described above with reference to FIG. 2. For instance, in FIG. 6a, the seventh gesture input may be a rightward input. In addition, a position of the seventh gesture input is freely selected so long as the seventh gesture input is detected within the additional alarm 250 for setting of the second additional alarm.

The display device 100 may determine a time interval of a plurality of second additional alarms based on a position of the seventh gesture input. More specifically, the display device 100 may determine a time interval of the second additional alarms according to amount of movement in position of the detected seventh gesture input. In FIG. 6a, the amount of movement in position of the seventh gesture input is a difference between the beginning position and the end position of the seventh gesture input. Here, the display device 100 may display a time interval interface when the seventh gesture input is detected.

In one example, the display device 100 may display a time interval interface at one side of upper and lower sides and left and right sides of the additional alarm 250 when the beginning position of the seventh gesture input to the additional alarm 250 is detected.

As described above with reference to FIG. 2, the time interval interface 230 represents a time interval of setting group alarms. For instance, in FIG. 6a, the time interval interface 230 may display a time interval of alarms set to 2 minutes, 4 minutes, 6 minutes, and 8 minutes. Here, the time interval displayed by the time interval interface 230 may correspond to a time interval predetermined by the display device 100 or a time interval predetermined by the user 10.

In another example, the display device 100 may determine a time interval of additional alarms when the end position of the seventh gesture input to the additional alarm is detected. For instance, referring to FIG. 6a, the display device 100 may determine a time interval of additional alarms to be 4 minutes because the end position of the seventh gesture input corresponds to 4 minutes displayed at the time interval interface 230.

Next, the display device 100 may detect an eighth gesture input. Here, the eighth gesture input may be equal to the above-described second gesture input of FIG. 2. In FIG. 6b, the eighth gesture input may correspond to a drag input to the additional alarm 250.

Next, the display device 100 may determine the number of second additional alarms based on a position of the detected eighth gesture input. More specifically, the display device 100 may determine the number of second additional alarms according to amount of movement in position of the detected eighth gesture input. In FIG. 6b, the amount of movement in position of the eighth gesture input corresponds to a difference between the beginning position and the end position of the eighth gesture input. In addition, the display device 100 may display the additional alarm interface 240 when the eighth gesture input is detected.

As described above with reference to FIG. 2, the additional alarm interface 240 represents at least one second additional alarm that may be added according to a time interval determined on the basis of a time of the additional alarm. In FIG. 6b, since the eighth gesture input is a downward input, a second additional alarm interface with respect to time increment may be displayed downward.

Next, the display device 100 may display more than one second additional alarms according to the determined time interval and the determined number of the second additional alarms. In FIG. 6b, a time interval of the second additional alarms may be determined to be 4 minutes, and the number of the second additional alarms may be determined to be 2. Therefore, the display device 100 may display the second additional alarms set to '8:19 AM' and '8:23 AM' proximate to an alarm set to '8:15 AM'. Here, it is noted that positions of the second additional alarms are not necessarily determined so long as the second additional alarms are positioned proximate to any one additional alarm. For instance, in FIG. 6b, the second additional alarms may be located below the right side of the additional alarm 250 set to '8:15 AM'.

In addition, the display device 100 may provide a graphic effect based on the seventh gesture input and the eighth gesture input to the additional alarm 250 to allow the user to easily recognize a time interval of additional alarms and the number of additional alarms. As exemplarily shown in FIG. 6a, the graphic effect may gradually be extended rightward based on a position of the seventh gesture input. In addition, as exemplarily shown in FIG. 6b, the graphic effect may gradually be extended downward based on a position of the eighth gesture input.

The second additional alarms providing a different graphic effect than the additional alarm may be displayed. For instance, as exemplarily shown in FIG. 6b, to easily distinguish the base alarm 200, the additional alarms 250, and the second additional alarm from one another, the display device 100 may display the largest base alarm 200, the additional alarms 250 smaller than the base alarm 200, and the second additional alarms smaller than the additional alarms 250. In another example, the display device 100 may display the base alarm 200, the additional alarms 250, and the second additional alarms, the colors of which are different from one another.

Through the embodiments of FIGS. 6a and 6b, the user 10 may easily and rapidly set the additional alarm as well as the second additional alarm derived from the additional alarm via a gesture input.

Figure 7B:
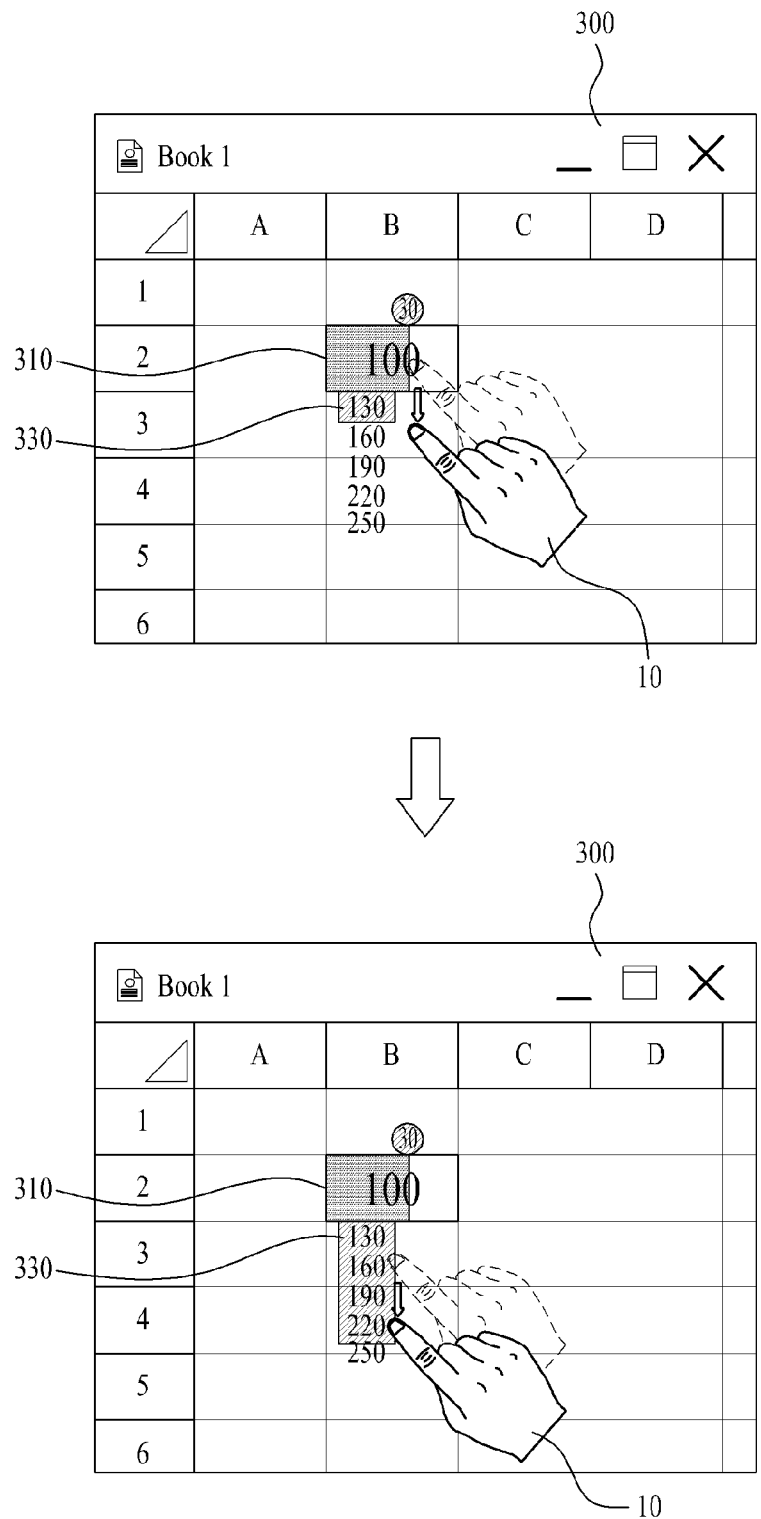

FIGS. 7a to 7c are views indicating one embodiment of group information according to the present disclosure. More specifically, FIG. 7a indicates setting of additional information via a first gesture input, and FIG. 7b indicates setting of additional information via a second gesture input. In addition, FIG. 7c indicates setting of group information in a spreadsheet.

The display device 100 may display the numeral '100' as base information 310 in a spreadsheet 300 exemplarily shown in FIG. 7a. Here, the base information 310 may include incremented/decremented information, such as dates, day of week, and the like, as well as numerals. The user 10 may wish to easily generate group information using the base information 310.

In this case, the display device 100 may detect a first gesture input to the base information 310. For instance, in FIG. 7a, the first gesture input may correspond to a rightward drag input. If the display device 100 detects the first gesture input to the base information 310, the display device 100 may display an interval interface 320 at one side of upper and lower sides and left and right sides of the base information 310. Here, the interval interface 320 represents an interval of information to be added on the basis of the base information 310. In FIG. 7a, numerals 10, 20, 30, and 40 may be displayed at the interval interface 320.

Next, the display device 100 may determine an interval of additional information based on a position of the detected first gesture input. More specifically, the display device 100 may determine an interval of additional information according to amount of movement in position of the detected first gesture input. The amount of movement in position of the first gesture input represents a difference between the beginning position and the end position of the first gesture input. In FIG. 7a, the end position of the first gesture input corresponds to the numeral 30 displayed at the interval interface 320. Accordingly, the display device 100 may determine an interval of additional information to be 30.

Next, the display device 100 may detect a second gesture input to the base information 310. For instance, in FIG. 7b, the second gesture input may correspond to a downward drag input. If the display device 100 detects the second gesture input to the base information 310, the display device 100 may display an additional information interface 330 at one side of upper and lower sides and left and right sides of the base information 310. Here, the additional information interface 330 represents at least one additional information to be added before and after the base information 310 according to a determined interval. In FIG. 7b, the additional information interface 330 may display numerals '130', '160', '190', '220', and '250' downward in this sequence according to an interval set to 30.

Next, the display device 100 may determine the number of additional information based on a position of the detected second gesture input. More specifically, the display device 100 may determine the number of additional information according to amount of movement in position of the detected second gesture input. The amount of movement in position of the second gesture input represents a difference between the beginning position and the end position of the second gesture input. In FIG. 7b, the end position of the second gesture input corresponds to the numeral '220' displayed at the additional information interface 330. Accordingly, the display device 100 may determine the number of additional information to be 4.

Accordingly, the display device 100 may display at least one additional information according to the determined interval and the determined number of units of additional information. In FIG. 7c, the display device 100 may display numerals '130', '160', '190', and '220' downward of the base information 310. Through an embodiment of FIG. 7c, the user 10 may easily create a table via a gesture without manipulating a mouse in a spreadsheet program, such as Excel.

Figure 8:
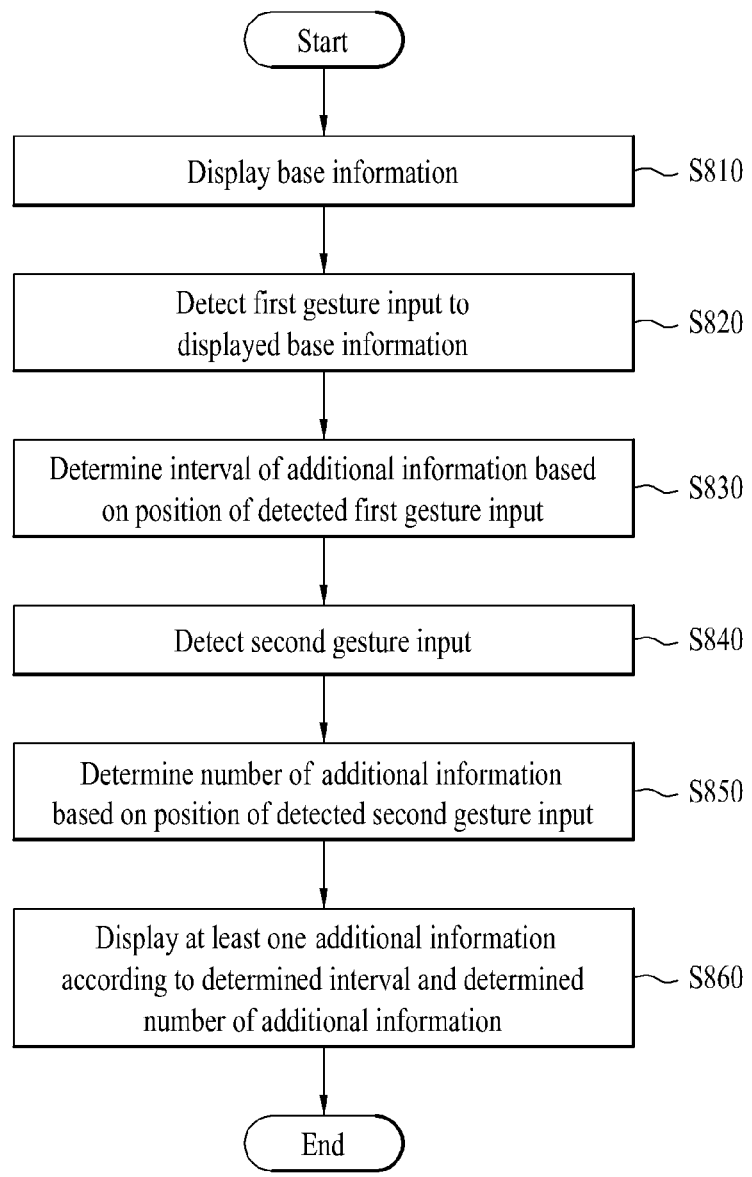
FIG. 8 is a flowchart of a method of setting group information of a display device according to the present disclosure.

FIG. 8 is a flowchart of a method of setting group information of a display device according to the present disclosure. The processor 130 of the display device 100 exemplarily shown in FIG. 1 may control each operation of FIG. 8.

First, the display device may display base information (S810). For instance, as exemplarily shown in FIG. 2, the base information may correspond to alarm information set by the display device. In addition, for instance, as exemplarily shown in FIG. 7, the base information may correspond to information input to a spreadsheet.

Next, the display device may detect a first gesture input to the displayed base information (S820). As described above with reference to FIG. 2, the first gesture input is an input by the user, and may include a touch input, a drag input, and a hovering input, for instance. In addition, the first gesture input may correspond to a rightward input.

As described above with reference to FIGS. 2a to 2c and FIGS. 7a to 7c, the display device may display an interval interface when the first gesture input is detected. Here, the interval interface may represent an interval of information to be added on the basis of the base information. For instance, in FIGS. 2a to 2c, the interval interface may correspond to a time interval interface.

Next, the display device may determine an interval of additional information based on a position of the detected first gesture input (S830). More specifically, the display device may determine an interval of additional information according to amount of movement in position of the detected first gesture input. Here, the amount of movement in position of the first gesture input represents a difference between the beginning position and the end position of the first gesture input. In addition, the display device may determine an interval of additional information based on a position of the interval interface corresponding to a position of the detected first gesture input.

Next, the display device may detect a second gesture input (S840). For instance, the display device may detect a second gesture input to the base information. As described above with reference to FIG. 2, the second gesture input is an input by the user, and may include a touch input, a drag input, and a hovering input, for instance. In addition, the second gesture input may correspond to a downward input.

As described above with reference to FIGS. 2a to 2c and FIGS. 7a to 7c, the display device may display an additional information interface at one side of upper and lower sides and left and right sides of the base information when the second gesture input is detected. Here, the additional information interface may represent at least one additional information to be added before and after the base information according to a determined interval. In FIGS. 2a to 2c, the additional information interface may correspond to an additional alarm interface.

The direction of the first gesture input may be different from the direction of the second gesture input. For instance, as described above, the first gesture input may correspond to a rightward input, and the second gesture input may correspond to a downward input. That is, the directions of the first gesture input and the second gesture input may be perpendicular to each other. In addition, for instance, the first gesture input and the second gesture input may be successive inputs.

Next, the display device may determine the number of additional information based on a position of the detected second gesture input (S850). More specifically, the display device may determine the number of additional information according to amount of movement in position of the detected second gesture input. Here, the amount of movement in position of the second gesture input represents a difference between the beginning position and the end position of the second gesture input. In addition, the display device may determine an interval of additional information based on a position of the additional information interface corresponding to a position of the detected second gesture input.

Next, the display device may display at least one additional information according to the determined interval and the determined number of the additional information (S860).

Although the respective drawings have been described individually for convenience, the embodiments described in the respective drawings may be combined to realize novel embodiments. In addition, designing a computer readable recording medium in which a program to execute the above-described embodiments is recorded according to a need of those skilled in the art is within the scope of the disclosure.

A display device and a method of setting group alarms according to the present disclosure are not limited to the configurations and methods of the above described embodiments, and all or some of the embodiments may be selectively combined to achieve various modifications.

Meanwhile, the display device and the method of setting group alarms may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

As is apparent from the above description, according to one embodiment, the user may easily set a plurality of alarms in a display device via a single gesture input.

According to another embodiment, the user may delete all of the plurality of alarms set in the display device via a single gesture input.

According to another embodiment, the user may easily switch the plurality of alarms set in the display device from 'On' to 'Off' via a singe gesture input.

According to another embodiment, the user may easily add at least one additional alarm using a gesture input in a state in which the plurality of alarms is set in the display device.

According to a further embodiment, the user may easily input information via a gesture input when inputting incremented/decremented information into a spreadsheet.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

In addition, the disclosure describes both a device invention as well as a method invention, and descriptions of both inventions may be complementarily applied as needed.

What is claimed is:

1. A display device comprising:
a display unit configured to display visual information;
a sensor unit configured to detect an input signal and to transmit a detected result to a processor; and
the processor configured to control the display unit and the sensor unit,
wherein the processor is further configured to:
display a base alarm,
detect a first gesture input to the displayed base alarm,
determine an interval of additional alarms based on a position of the detected first gesture input,
detect a second gesture input,
determine a number of the additional alarms based on a position of the detected second gesture input, and
display at least one additional alarm according to the determined interval and the determined number of the additional alarms, wherein the base alarm and the additional alarms are combined as a group alarm, and
switch off all alarms included in the group alarm when a third gesture input to at least one of the group alarm is detected and a time of the at least one of the group alarm has come.

2. The display device according to claim 1, wherein the processor is further configured to:
determine that the at least one additional alarm is added before the base alarm according to the interval if the direction of the second gesture input is in a first direction, and
determine that the at least one additional alarm is added after the base alarm according to the interval if the direction of the second gesture input is in a second direction.

3. The display device according to claim 2, wherein the first direction and the second direction are opposite to each other.

4. The display device according to claim 1, wherein the processor is further configured to:
detect a fourth gesture input, and
add the at least one additional alarm before and after the base alarm according to the interval based on a position of the second gesture input and a position of the fourth gesture input.

5. The display device according to claim 4, wherein the direction of the fourth gesture input is opposite to the direction of the second gesture input.

6. The display device according to claim 1, wherein the processor is further configured to:
detect fourth gesture input to the base alarm, wherein the direction of the fourth gesture input being opposite to the direction of the first gesture input, and
delete the entire group of alarms based on the detected fourth gesture input.

7. The display device according to claim 1, wherein the processor is further configured to:
detect a fourth gesture input to the at least one additional alarm, and
delete an additional alarm corresponding to a position of the fourth gesture input among the group of alarms based on the detected fourth gesture input.

8. The display device according to claim 1, wherein the processor is further configured to:
display an interval interface when the first gesture input is detected, and
determine an interval of the additional alarms according to a position of the interval interface corresponding to a position of the first gesture input.

9. The display device according to claim 1, wherein the processor is further configured to:
display an additional alarm interface when the second gesture input is detected, and
determine the number of additional alarms based on a position of the additional alarm interface corresponding to a position of the second gesture input.

10. The display device according to claim 1, wherein the direction of the first gesture input is different from the direction of the second gesture input.

11. The display device according to claim 10, wherein the direction of the first gesture input and the direction of the second gesture input are perpendicular to each other.

12. The display device according to claim 1, wherein the first gesture input and the second gesture input are connected to each other.

13. The display device according to claim 1, wherein the processor is further configured to indicate the determined interval of the additional alarms and the determined number of the additional alarms using a graphic effect.

14. The display device according to claim 1, wherein the processor is further configured to:
detect a fourth gesture input to the at least one additional alarm, and
determine a second additional alarm interval according to a length of the detected fourth gesture input, wherein the second additional alarm interval corresponds to the determined interval of the additional alarms.

15. The display device according to claim 14, wherein the processor is further configured to:
detect a fifth gesture input,
determine a number of second additional alarms based on a position of the detected fifth gesture input, and
display at least one second additional alarm according to the determined interval and the determined number of the second additional alarms.

16. The display device according to claim 15, wherein the additional alarms and the at least one second additional alarm are combined as the group alarm.

17. A method of setting a group alarm of a display device, the method comprising:
displaying a base alarm;
detecting a first gesture input to the displayed base alarm;
determining an interval of additional alarms based on a position of the detected first gesture input;
detecting a second gesture input;
determining a number of the additional alarms based on a length of the detected second gesture input; and
displaying at least one additional alarm according to the determined interval and the determined number of the additional alarms, wherein the base alarm and the additional alarms are combined as the group alarm, and
switch off all alarms included in the group alarm when a third gesture input to at least one of the group alarm is detected and a time of the at least one of the group alarm has come.

* * * * *